United States Patent
Furuhashi et al.

(10) Patent No.: US 7,694,089 B2
(45) Date of Patent: Apr. 6, 2010

(54) RESOURCE EFFICIENT REMOTE COPY PAIR FOR DATA RETENTION

(75) Inventors: Ryoji Furuhashi, Yokohama (JP); Masayuki Yamamoto, Sagamihara (JP); Yasunori Kaneda, Sagamihara (JP); Masayasu Asano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1042 days.

(21) Appl. No.: 11/181,874

(22) Filed: Jul. 15, 2005

(65) Prior Publication Data
US 2006/0242372 A1 Oct. 26, 2006

(30) Foreign Application Priority Data
Apr. 21, 2005 (JP) ............................. 2005-123821

(51) Int. Cl.
*G06F 12/16* (2006.01)
(52) U.S. Cl. .................. 711/162; 711/112; 711/163; 711/E12.019
(58) Field of Classification Search .................. 711/154, 711/162, 163
See application file for complete search history.

(56) References Cited

U.S. PATENT DOCUMENTS 5,794,253 A * 8/1998 Norin et al. .................. 707/203
2004/0268038 A1 12/2004 Nagasoe et al.
2005/0097260 A1 * 5/2005 McGovern et al. .......... 711/100
2006/0123232 A1 * 6/2006 Cannon et al. .............. 713/165
2006/0179087 A1 * 8/2006 Fujii et al. ................... 707/205

FOREIGN PATENT DOCUMENTS

JP 2000-112822 4/2000

* cited by examiner

*Primary Examiner*—Reginald G Bragdon
*Assistant Examiner*—Kenneth M Lo
(74) *Attorney, Agent, or Firm*—Brundidge & Stanger, P.C.

(57) ABSTRACT

A data processing system in which resources of a remote copy are prevented from being wasted uselessly during a data-retention period is provided. The data processing system includes: an application server 2000, a primary storage system 4000 which stores data used by the application server in a first storage volume, a secondary storage volume 5000 which stores the copy of data stored in the primary storage system in a second storage volume, and a management server 1000 which controls the primary storage system and secondary storage system; and the primary storage system and secondary storage system are configured to include an access control table in which an access inhibited or access permitted state with respect to the first storage volume and second storage volume is stored, and a remote copy pair table in which a corresponding relation between the first storage volume and the second storage volume is stored.

15 Claims, 8 Drawing Sheets

| Storage Volume ID (4411) | Write-Permission State (4412) |
|---|---|
| 00 | YES |
| 02 | YES |
| 02 | NO |

| Storage Volume ID (4421) | Volume Attribute (4422) | Remote Side Storage System ID (4423) | Remote Side Storage Volume ID (4424) |
|---|---|---|---|
| 00 | Primary | 20000 | A0 |
| 01 | Primary | 20000 | A1 |
| 02 | Secondary | 20000 | A2 |

| Storage Volume ID (5411) | Write-Permission State (5412) |
|---|---|
| A0 | Yes |
| A1 | Yes |
| A2 | Yes |

5420

| Storage Volume ID (5421) | Volume Attribute (5422) | Remote Side Storage System ID (5423) | Remote Side Storage Volume ID (5424) |
|---|---|---|---|
| A0 | Secondary | 10000 | 00 |
| A1 | Secondary | 10000 | 01 |
| A2 | Primary | 10000 | 02 |

| Storage System ID | Storage Volume ID | Data-Retention Start Data | Data-Retention End Data |
|---|---|---|---|
| 10000 | 00 | 2005/1/31 | 2010/1/31 |
| 10000 | 01 | 2005/2/28 | 2010/2/28 |

| Copy-Source Storage System ID | Copy-Source Storage Volume ID | Copy-Destination Storage System ID | Copy-Destination Storage Volume ID |
|---|---|---|---|
| 10000 | 00 | 20000 | A0 |
| 10000 | 01 | 20000 | A1 |
| 20000 | A2 | 10000 | A2 |

1221, 1222, 1223, 1224

RESOURCE EFFICIENT REMOTE COPY PAIR FOR DATA RETENTION

CROSS REFERENCES TO RELATED APPLICATIONS

The present invention contains subject matter related to Japanese Patent Application JP 2005-123821 and U.S. patent application Ser. No. 10/883,753, the entire contents of which are incorporated herein by reference.

BACKGROUND

The present invention relates to a data holding technology in a storage system, and particularly relates to a data processing system, a storage system, a data processing method, and a computer system in storage systems that use a remote copy technology, in which resources used by a remote copy are reduced during a data-retention period.

In recent years, a computer system has been used widely among business organizations, and importance of data stored in a storage system has increased. Among data stored in a storage system, there are such data which is legally obligated under laws and regulations to be stored for a certain period of time in a state where there are assurances they will not be falsified or altered.

As a method of retaining data for a certain period of time in a state of not being falsified, there is a method in which an exchangeable tape device or the like is used as a memory medium and the memory medium is taken out and kept in a storeroom and the like. On the other hand, in order to retain data for a certain period of time in a storage system such as a disk array, from which a memory medium can not be taken out, some kind of method with which retained data cannot be falsified is needed. As a method to satisfy this need, there is a storage system control method described in Patent Reference 1, for example. In this method, any one of three kinds of access attribute modes of: read/write both possible, write not possible, and read/write both not possible is set to each storage extent in a storage system, and different processing and response to a command from a host are performed in each storage extent in accordance with this setting.

In addition, a technology such as a RAID (Redundant Array of Inexpensive Disks) having a redundant storage extent is employed in a storage system in order to protect stored data. However, with the redundant storage extent in the storage system, there is a possibility that the storage system itself be lost when a large-scale disaster occurs. Then, a storage system is provided with a remote copy technology in order to protect data even if a large-scale disaster occurs. The remote copy is technology in which the storage system itself has redundancy to be disposed in a remote place and data is replicated in the remote storage system (in a copy-destination storage system). Specifically, when receiving a request from a host computer to write data, a copy-source storage system stores the data in its own system and further replicates the data in the copy-destination storage system through a communication line.

Further, as another method in which stored data is in a state of not being falsified, a storage system capable of inhibiting writing is disclosed in Patent Reference 2, for example.

[Patent Reference 1] Published Japanese Patent Application No. 2000-112822

[Patent Reference 2] Published United States Patent Application No. 2004-0268038

According to the above-described technology in related art, writing to a storage extent in a storage system may be inhibited during a data-retention period in order to prevent data stored in the storage system from being falsified. In addition, even if a large-scale disaster occurs, data may be replicated in a storage system disposed in a remote place in order to protect data in a storage system. However, since the writing to the storage extent is inhibited during the data-retention period, there is an inconvenience that resources for performing a data copy to the remote storage system is still used even though the data is not to be copied to the remote storage system.

SUMMARY OF THE INVENTION

Therefore, the present invention aims to provide a data processing system, a storage system, a data processing method and a computer system in which remote copy resources are used and not wasted even in a data-retention period uselessly during the data.

In order to solve the above-described problem and to achieve the aim of the present invention, a data processing system of the present invention has a first storage system and a second storage system including: an access control unit which controls access from a business computer to a first storage extent and second storage extent to be inhibited and/or permitted based on control information from a management computer and a data transfer control unit which retains a corresponding relation between the first storage extent and the second storage extent and which controls a start and stop of data transfer from the first storage extent to the second storage extent and/or a cancellation of the corresponding relation based on the control information from the management computer; and the management computer which controls the data transfer control unit in the first storage system and second storage system, with respect to the data transfer between the first storage system and the second storage system and the data writing to the first storage extent and second storage extent by controlling the access inhibited or permitted state of the access control unit based on a data-retention period which is set in advance.

With the above configuration, data copy from the first storage system to the remote second storage system is not performed during the data-retention period. In that case, the corresponding relation between the first storage extent and the second storage extent with which data is copied from the first storage system to the remote second storage system is retained also during the data-retention period.

Then, when the data-retention period has lapsed, the writing to the first storage extent and the second storage extent is permitted and the data in the first storage extent is erased, while prior to the processing the data copy from the first storage system to the remote second storage system is again configured to be performed based on the above-described corresponding relation between the first storage extent and the second storage extent, thereby automatically erasing the data in the second storage extent of the remote second storage system.

Alternatively, when the data-retention period has lapsed, based on the above-described corresponding relation between the first storage extent and the second storage extent, the processing of erasing the data is performed on the first copy-source storage extent and on the second copy-destination storage extent without performing the data copy.

According to the present invention, in a storage system in which during the data-retention period, writing to a storage extent is inhibited in order to prevent the data stored in the storage system from being falsified, and the same data is copied to a remote storage system in order to protect the data if a large-scale disaster occurs, remote copy resources can be prevented from being wasted uselessly during a data-retention period.

BRIEF DESCRIPTION OF THE DRAWINGS

FIG. 4 shows a configuration of an access control table;

FIG. 5 shows a configuration of a remote copy pair table;

FIG. 6 shows a configuration of an access control table;

FIG. 9 shows a configuration of a data-retention period table;

FIG. 10 shows a configuration of a remote copy pair table;

DESCRIPTION OF THE PREFERRED EMBODIMENTS

Hereinafter, embodiments of the present invention are explained with reference to accompanying drawings.

Figure 1:
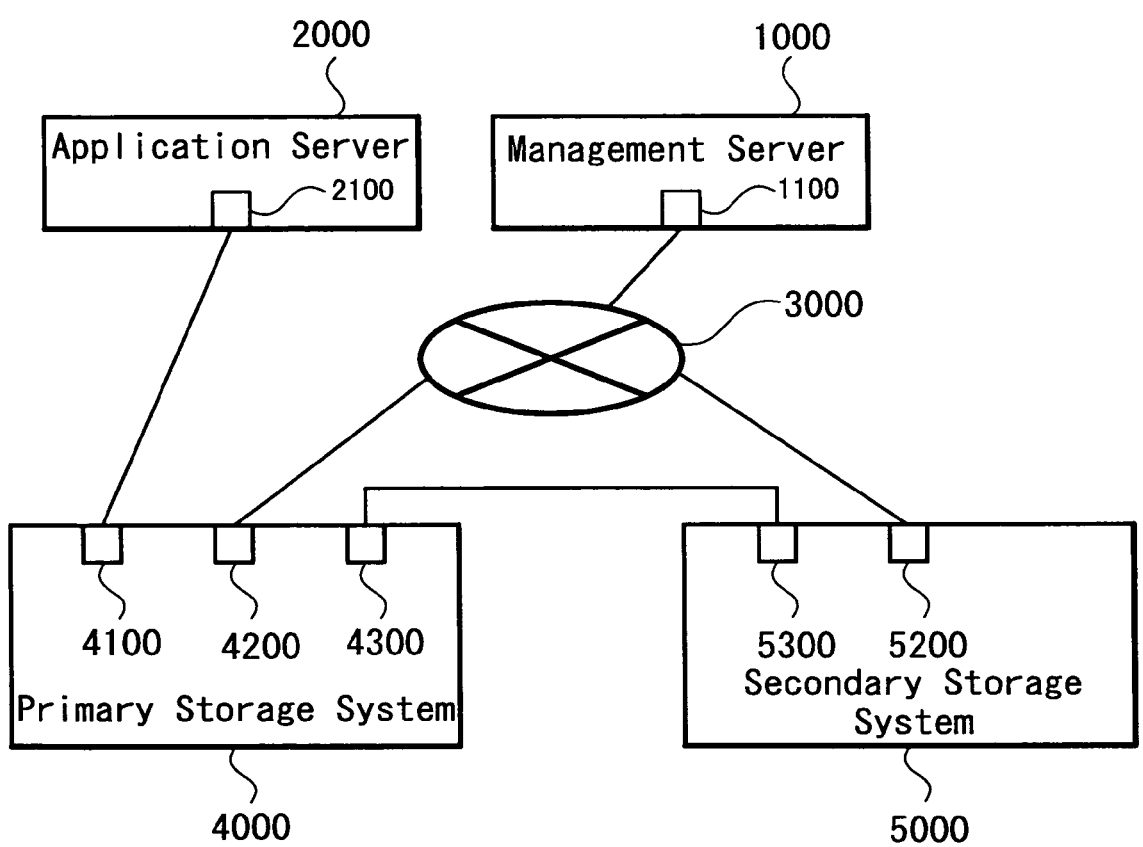
FIG. 1 is a block diagram showing a computer system according to an embodiment of the present invention.

FIG. 1 is a block diagram showing a computer system according to an embodiment of the present invention.

This computer system is configured to include a management server 1000, an application server 2000, a SAN (Storage Area Network) 3000, a primary storage system 4000, and a secondary storage system 5000.

The management server 1000 is a computer which transmits control information to the primary storage system 4000 and secondary storage system 5000. The management server 1000 is provided with a HBA (Host Bus Adapter) 1100. The HBA 1100 is connected to a channel controller 4200 of the primary storage system 4000 and a channel controller 5200 of the secondary storage system 5000 through the SAN 3000.

The application server 2000 is a computer which stores data to be used in the primary storage system 4000 and executes an application. The application server 2000 is provided with a HBA 2100. The HBA 2100 is connected to a channel controller 4100 of the primary storage system 4000.

The primary storage system 4000 is an external storage apparatus which stores data to be used by the application server 2000. The primary storage system 4000 is provided with the channel controller 4100, the channel controller 4200, and a channel controller 4300. The channel controller 4300 is connected to a channel controller 5300 in the secondary storage system 5000.

The secondary storage system 5000 is an external storage apparatus which stores the same data as that stored in the primary storage system 4000 in order to maintain the redundancy. The secondary storage system 5000 is provided with the channel controller 5200 and the channel controller 5300.

Note that although one application server 2000, one primary storage system 4000, and one secondary storage system 5000 are respectively shown in the figure, two or more servers and storage systems may be provided to constitute a pair so that a plurality of remote copy pairs described later on can be formed.

Figure 2:
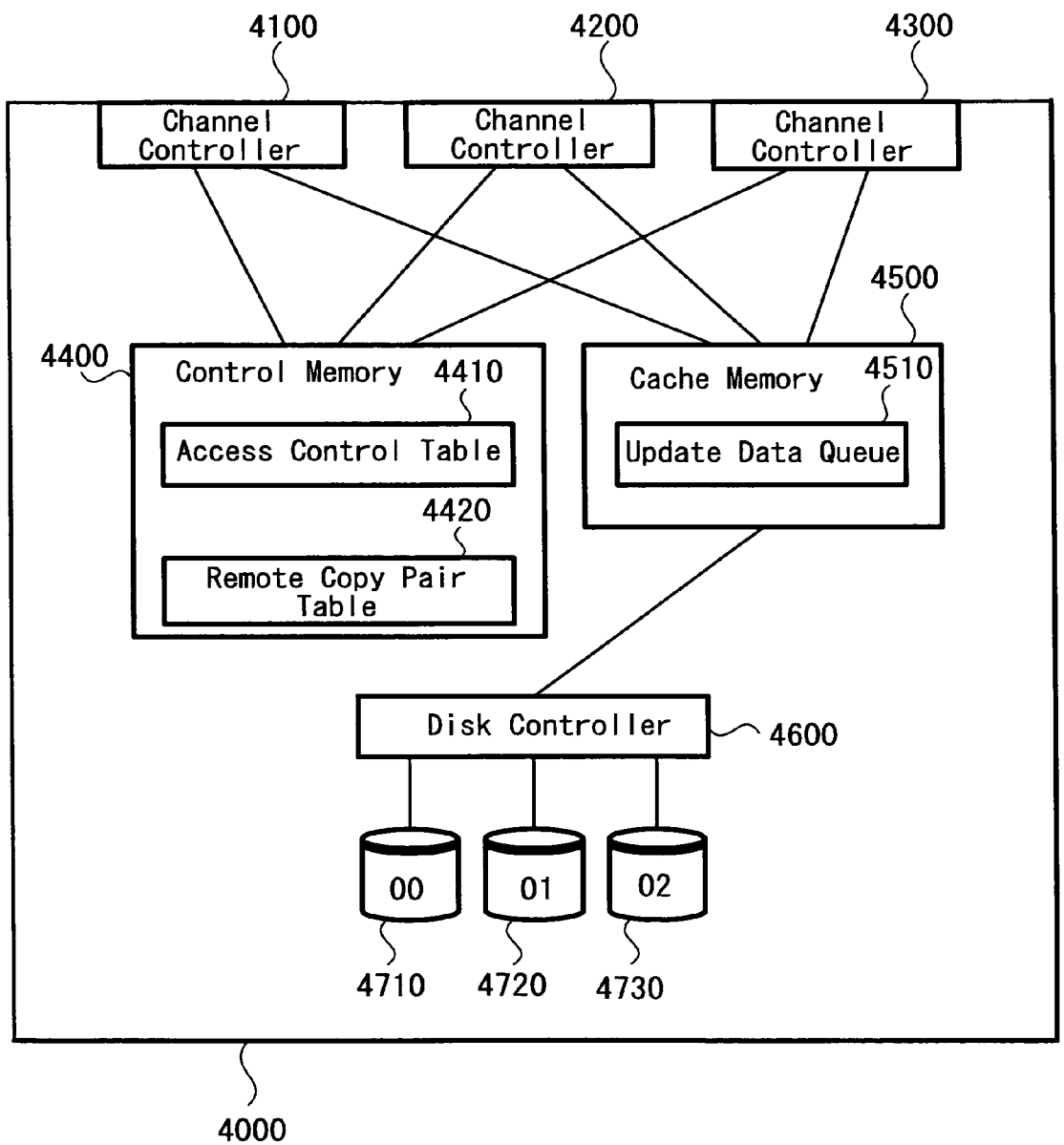
FIG. 2 is a block diagram showing a primary storage system.

FIG. 2 is a block diagram showing the primary storage system 4000.

The primary storage system 4000 is configured to include the channel controller 4100, the channel controller 4200, the channel controller 4300, a control memory 4400, a cache memory 4500, a disk controller 4600, a storage volume 4710, a storage volume 4720, and a storage volume 4730.

The channel controller 4100 controls a data I/O from the application server 2000. The channel controller 4100 is connected to the control memory 4400 and cache memory 4500, and is capable of performing data reading/data writing on the control memory 4400 and cache memory 4500.

The channel controller 4200 controls a data I/O from the management server 1000. The channel controller 4200 is connected to the control memory 4400 and cache memory 4500, and is capable of performing data reading/data writing on the control memory 4400 and cache memory 4500.

The channel controller 4300 controls a remote copy to the secondary storage system 5000. The channel controller 4300 is connected to the control memory 4400 and cache memory 4500, and is capable of performing data reading/data writing on the control memory 4400 and cache memory 4500.

The control memory 4400 is a memory which stores information for controlling the data I/O and remote copy. An access control table 4410 and a remote copy pair table 4420 are stored in the control memory 4400. The access control table 4410 shows a write-permission state with respect to the storage volume 4710, storage volume 4720, and storage volume 4730 as described later in FIG. 4. The remote copy pair table 4420 shows a corresponding relation between storage volumes of the primary storage system 4000 and the secondary storage system 5000 in order to control the remote copy to the secondary storage system 5000 as described later in FIG. 5.

The cache memory 4500 is a high-speed memory which stores read data and write data. In the primary storage system 4000, high I/O performance can be obtained by temporarily storing data in the cache memory 4500. An update data queue 4510 can be provided in the cache memory 4500. Update data written from the application server 2000 is stored in the update data queue 4510 in order of data arrival, and the update data is retained until copied to the secondary storage system 5000 by the channel controller 4300. Note that the update data queue 4510 may not be provided in the cache memory 4500, but may be provided in the storage volume 4730, for example.

The disk controller 4600 interfaces the storage volume 4710, storage volume 4720, and storage volume 4730, and transmits and receives data and a control signal using Fibre Channel Protocol, for example.

The storage volume 4710, storage volume 4720, and storage volume 4730 store data used by the application server 2000. The storage volume 4710, storage volume 4720, and storage volume 4730 may be a part of an extent of one disk drive. The storage volume 4710, storage volume 4720, and storage volume 4730 are not necessarily physically configured to be one device, but may be an aggregate of storage extents distributed to a plurality of disk drives, for example. Further, the storage volume 4710, storage volume 4720, and storage volume 4730 may be configured to have redundancy such as a mirror configuration or RAID to which parity data is added, for example.

Note that here a configuration to perform the remote copy of data from the storage volume 4710, storage volume 4720, and storage volume 4730 in the primary storage system 4000 to a storage volume 5710, storage volume 5720, and storage volume 5730 in the secondary storage system 5000 is shown, but the configuration is not limited thereto; the remote copy of data may be performed from the storage volume 4710 to the storage volume 4720 or to storage volume 4730 within the primary storage system 4000.

In this case, the remote copy pair table 4420 may be configured to show a corresponding relation between the storage volume 4710 and the storage volume 4720 or storage volume 4730 within the primary storage system 4000 in order to control the remote copy from the storage volume 4710 to the storage volume 4720 or storage volume 4730 within the primary storage system 4000.

Figure 3:
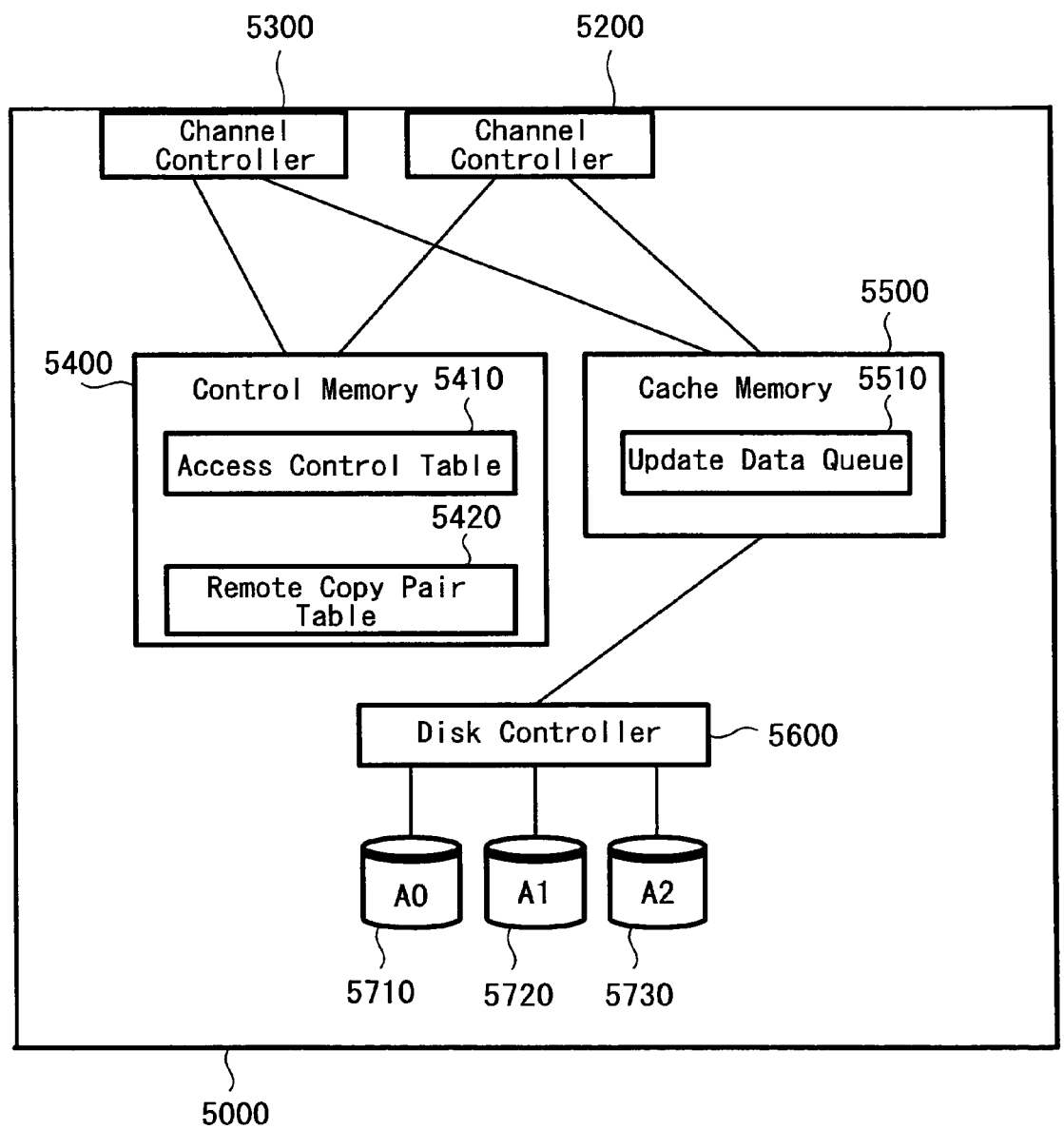
FIG. 3 is a block diagram showing a secondary storage system.

FIG. 3 is a block diagram showing the secondary storage system 5000.

The secondary storage system 5000 is configured to include the channel controller 5200, the channel controller 5300, a control memory 5400, a cache memory 5500, a disk controller 5600, the storage volume 5710, the storage volume 5720, and the storage volume 5730.

The channel controller 5200 controls a data I/O from the management server 1000. The channel controller 5200 is connected to the control memory 5400 and cache memory 5500, and is capable of performing data reading/data writing on the control memory 5400 and cache memory 5500.

The channel controller 5300 controls a remote copy to the primary storage system 4000. The channel controller 5300 is connected to the control memory 5400 and cache memory 5500, and is capable of performing data reading/data writing on the control memory 5400 and cache memory 5500.

The control memory 5400 is a memory which stores information for controlling the data I/O and remote copy. An access control table 5410 and a remote copy pair table 5420 are stored in the control memory 5400. The access control table 5410 shows a write-permission state to the storage volume 5710, storage volume 5720, and storage volume 5730 as described later in FIG. 6. The remote copy pair table 5420 shows a corresponding relation between the storage volumes of the secondary storage system 5000 and the primary storage system 4000 in order to control the remote copy to the primary storage system 4000 as described later in FIG. 7.

The cache memory 5500 is a high-speed memory which stores read data and write data. In the secondary storage system 5000 high I/O performance can be obtained by temporarily storing data in the cache memory 5500. An update data queue 5510 may be provided in the cache memory 5500. Update data written from the application server (not illustrated) which makes data to be stored in the secondary storage system 5000 is stored in the update data queue 5510, and the update data is retained until copied to the primary storage system 4000 by the channel controller 5300. Note that the update data queue 5510 may be not provided in the cache memory 5500, but may be provided in the storage volume 5730, for example.

The disk controller 5600 interfaces the storage volume 5710, storage volume 5720, and storage volume 5730, and transmits and receives data and a control signal using Fibre Channel Protocol, for example.

The storage volume 5710, storage volume 5720, and storage volume 5730 store data used by the application server (not illustrated) which makes data to be stored in the secondary storage system 5000. The storage volume 5710, storage volume 5720, and storage volume 5730 may be a part of an extent of one disk drive. The storage volume 5710, storage volume 5720, and storage volume 5730 are not necessarily physically configured to be one device but may be an aggregate of storage extents distributed to a plurality of disk drives, for example. Further, the storage volume 5710, storage volume 5720, and storage volume 5730 may have redundancy such as a mirror configuration or RAID to which parity data is added, for example.

Hereupon, a configuration to perform the remote copy of data from the storage volume 4710, storage volume 4720, and storage volume 4730 in the primary storage system 4000 to the storage volume 5710, storage volume 5720, and storage volume 5730 in the secondary storage system 5000 is shown, but the configuration is not limited thereto; the remote copy of data may be performed from the storage volume 5710 to the storage volume 5720 or storage volume 5730 within the secondary storage system 5000.

In this case, the remote copy pair table 5420 may be configured to show a corresponding relation between the storage volume 5710 and the storage volume 5720 or storage volume 5730 within the secondary storage system 5000 in order to control the remote copy from the storage volume 5710 to the storage volume 5720 or storage volume 5730 within the secondary storage system 5000.

FIG. 4 shows a configuration of the access control table 4410 stored in the control memory 4400 in the primary storage system 4000.

The access control table 4410 is configured to include a storage volume ID 4411 and a write-permission state 4412. The storage volume ID 4411 is an identifier for specifying the storage volume 4710, storage volume 4720, and storage volume 4730 in the primary storage system 4000. The write-permission state 4412 is information showing whether data writing is permitted or inhibited with respect to the relevant storage volume 4710, storage volume 4720, and storage volume 4730.

In the access control table 4410, the write-permission state 4412 is set to a data write-permission state or a data write-inhibition state on a data-retention start date in accordance with the storage volume ID 4411, and on the data-detention end date the write-permission state 4412 is again set to the data write-permission state with respect to all the storage volume ID 4411.

FIG. 5 shows a configuration of the remote copy pair table 4420 stored in the control memory 4400 in the primary storage system 4000.

The remote copy pair table 4420 is configured to include a storage volume ID 4421, a volume attribute 4422, a remote side storage system ID 4423, and a remote side storage volume ID 4424. The storage volume ID 4421 is an identifier for specifying the storage volume 4710, storage volume 4720, and storage volume 4730 in the primary storage system 4000.

The volume attribute 4422 is information showing whether the storage volume specified by the storage volume ID 4421 is of a copy source or a copy destination, and shows that the storage volume is of the copy source when a value is "Primary" and that the storage volume is of the copy destination when the value is "Secondary". The remote side storage system ID 4423 is an identifier for specifying the storage system of the copy destination or copy source of the storage volume specified by the storage volume ID 4421. The remote side storage volume ID 4424 is an identifier for specifying the storage volume of the copy destination or copy source of the storage volume specified by the storage volume ID 4421 in the storage system specified by the remote side storage system ID 4423.

Hereupon, when a plurality of pairs are formed as the remote copy pairs, a plurality of remote side storage system ID 4423 and a plurality of remote side storage volume ID 4424 are set with respect to the storage volume ID 4421 [00, 01, 02] such that the remote side storage system ID 4423 is set to "3000, 3000, 3000" - - - , and the remote side storage volume ID 4424 is set to "B0, B1, B2" - - - .

Further, when the remote copy pair is formed within the same storage system, the remote side storage system ID 4423 is set to "1000, 1000, 1000" so as to show the same storage system and the remote side storage volume ID 4424 is set to "01, 02, 00" so as to show another storage volume ID within the same storage system with respect to the storage volume ID 4421 [00, 01, 02].

An explanation is made to an example in which the channel controller 4100 in the primary storage system 4000 performs processing on a data update request from the application server 2000, using the above-described access control table 4410 shown in FIG. 4 and remote copy pair table 4420 shown in FIG. 5.

When receiving a data update request from the application server 2000, the channel controller 4100 obtains a storage volume ID included in the data update request. Then, the channel controller 4100 communicates with the control memory 4400, refers to the contents of the access control table 4410 shown in FIG. 4, and obtains a value of the write-permission state 4412 of a record in which the obtained storage volume ID included in the data update request coincides with a value of the storage volume ID 4411. When the obtained value of the write-permission state 4412 is "No", the channel controller 4100 returns a reply indicating a failure of the data update to the application server 2000.

When the obtained value of the write-permission state 4412 is "Yes", the channel controller 4100 communicates with the control memory 4400, refers to the contents of the remote copy pair table 4420 shown in FIG. 5, and obtains the record in which the obtained storage volume ID included in the data update request coincides with the value of the storage volume ID 4421.

When a value of the volume attribute 4422 in the obtained record is "Primary", the channel controller 4100 stores the data update request from the application server 2000 in the update data queue 4510 and further stores the update data of the storage volume specified by the storage volume ID included in the data update request through the cache memory 4500 and disk controller 4600. Further, when the value of the volume attribute 4422 in the obtained record is "Secondary", the channel controller 4100 returns a reply indicating a failure of the data update to the application server 2000. When the value of the volume attribute 4422 is "Secondary", writing to the volume other than the remote copy is inhibited.

An explanation is made to an example in which the channel controller 4100 in the primary storage system 4000 performs processing on control information from the management server 1000, using the above-described access control table 4410 shown in FIG. 4 and remote copy pair table 4420 shown in FIG. 5.

When receiving control information from the management server 1000, the channel controller 4200 communicates with the control memory 4400, and rewrites contents of the access control table 4410 shown in FIG. 4 or remote copy pair table 4420 shown in FIG. 5 based on the control information.

The channel controller 4300 periodically communicates with the cache memory 4500, and reads out the oldest data in the update data queue 4510. The channel controller 4300 obtains a storage volume ID from the read-out data, communicates with the control memory 4400, refers to the remote copy pair table 4420 shown in FIG. 5, and obtains a record in which the obtained storage volume ID coincides with the storage volume ID 4411. The channel controller 4300 obtains a value of the remote side storage system ID 4423 and a value of the remote side storage volume ID 4424 from the obtained record, and transmits to the storage system specified by the value of the remote side storage system ID 4423 a data writing request read out from the update data queue 4510 to the storage volume specified by the value of the remote side storage volume ID 4424.

When a reply indicating that the transmitted data writing request is completed normally is returned, the channel controller 4300 deletes the oldest data in the update data queue 4510. Note that although the example of the remote copy operation in which the channel controller 4300 reads out data from the update data queue 4510 is shown in the this embodiment, the channel controller 5300 may perform a remote copy operation to read out data from the update data queue 4510.

FIG. 6 shows a configuration of the access control table 5410 stored in the control memory 5400 in the secondary storage system 5000.

The access control table 5410 is configured to include a storage volume ID 5411 and a write-permission state 5412. The storage volume ID 5411 is an identifier for specifying the storage volume 5710, storage volume 5720, and the storage volume 5730 in the secondary storage system 5000. The write-permission state 5412 is information showing a state of whether data writing is permitted to the relevant storage volume 5710, storage volume 5720, and storage volume 5730.

Figures 7, 8:
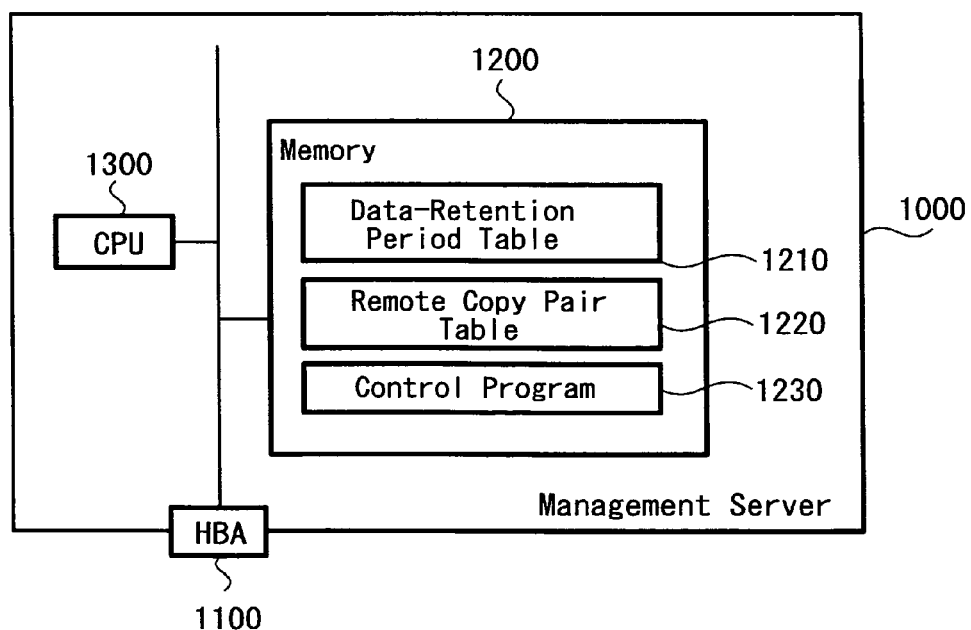
FIG. 7 shows a configuration of a remote copy pair table.
FIG. 8 is a block diagram showing a management server.

FIG. 7 shows a configuration of the remote pair table 5420 stored in the control memory 5400 in the secondary storage system 5000.

The remote copy pair table 5420 is configured to include a storage volume ID 5421, a volume attribute 5422, a remote side storage system ID 5423, and a remote side storage volume ID 5424.

The storage volume ID 5421 is an identifier for specifying the storage volume 5710, storage volume 5720, and storage volume 5730 in the secondary storage system 5000. The volume attribute 5422 is information showing a state of whether the storage volume specified by the storage volume ID 5421 is a copy source or a copy destination, and shows that the storage volume is the copy source when a value is "Primary" and that the storage volume is the copy destination when the value is "Secondary". The remote side storage system ID 5423 is an identifier for specifying the storage system of the copy destination or copy source of the storage volume specified by the storage volume ID 5421. The remote side storage volume ID 5424 is an identifier for specifying the storage volume of the copy destination or copy source of the storage volume specified by the storage volume ID 5421 in the storage system specified by the remote side storage system ID 5423.

An explanation is made to an example in which the channel controller 5200 in the secondary storage system 5000 performs processing with respect to control information supplied from the management server 1000, using the above-described access control table 5410 shown in FIG. 6 and remote copy pair table 5420 shown in FIG. 7.

When receiving control information from the management server 1000, the channel controller 5200 communicates with the control memory 5400, and rewrites contents of the access control table 5410 shown in FIG. 6 or remote copy pair table 5420 shown in FIG. 7 based on the control information.

When receiving a data writing request from the primary storage system 4000, the channel controller 5300 obtains a storage volume ID included in the data writing request. Then, the channel controller 5300 communicates with the control memory 5400, refers to the contents of the access control table 5410 shown in FIG. 6, and obtains a value of the write-permission state 5412 of a record in which the obtained storage volume ID included in the data update request coincides with the value of the storage volume ID 5411.

When the obtained value of the write-permission state 5412 is "Yes", the channel controller 5300 stores the update data of the storage volume through the cache memory 5500 and disk controller 5600, and returns to the primary storage system 4000 a reply indicating success of the data writing. The channel controller 5300 returns to the primary storage system 4000 a reply indicating failure of the data writing when the obtained value of the write-permission state 5412 is "No".

FIG. 8 is a block diagram showing the management server 1000.

The management server 1000 is configured to include the HBA 1100, a memory 1200, and a CPU 1300. Each unit constituting the management server 1000 is connected to each other and is capable of mutually communicating.

The HBA 1100 interfaces with each storage system. Upon receiving a data transmission request from the CPU 1300, the HBA 1100 transmits data to the primary storage system 4000 or secondary storage system 5000 through the SAN 3000.

The memory 1200 stores a program executed by the CPU 1300 and data used in the program. A data-retention period table 1210, a remote copy pair table 1220, and a control program 1230 are stored in the memory 1200. The data-retention period table 1210 shows a data-retention start date and data-retention end date of the storage volume in the primary storage system 4000 as described later in FIG. 9. The remote copy pair table 1220 shows a corresponding relation between a copy-source storage volume and a copy-destination storage volume in the remote copy performed between the primary storage system 4000 and the secondary storage system 5000 as described later in FIG. 10. The control program 1230 refers to the data-retention period table 1210 and remote copy pair table 1220, and based on the result, transmits control information to the primary storage system 4000 and secondary storage system 5000 through the HBA 1100 as described later in FIG. 11.

The CPU 1300 communicates with the memory 1200 and HBA 1100, reads out and executes the control program 1230, and makes the HBA 1100 transmit the control information to the primary storage system 4000 and secondary storage system 5000.

Hereupon, the data-retention period table 1210, remote copy pair table 1220, and control program 1230 of the management server 1000 shown in FIG. 8 may be configured in the application server 2000, primary storage system 4000, or secondary storage system 5000 and the application server 2000, primary storage system 4000, or secondary storage system 5000 executes the remote copy control operation of the management server 1000.

FIG. 9 shows a configuration of the data-retention period table 1210 stored in the memory 1200.

The data-retention period table 1210 is configured to include a storage system ID 1211, a storage volume ID 1212, a data-retention start date 1213, and a data-retention end date 1214. The storage system ID 1211 is an identifier for specifying a storage system. The storage volume ID 1212 is an identifier for specifying a storage volume in the storage system specified by the storage system ID 1211. The data-retention start date 1213 is a retention start date of data stored in the storage volume specified by the storage system ID 1211 and storage volume ID 1212. The data-retention end date 1214 is a retention end date of the data stored in the storage volume specified by the storage system ID 1211 and storage volume ID 1212.

FIG. 10 shows a configuration of the remote copy pair table 1220 stored in the memory 1200.

The remote copy pair table 1220 is configured to include a copy-source storage system ID 1221, a copy-source storage volume ID 1222, a copy-destination storage system ID 1223, and a copy-destination storage volume ID 1224. The copy-source storage system ID 1221 is an identifier for specifying a storage system in which a copy-source storage volume for the remote copy exists. The copy-source storage volume ID 1222 is an identifier for specifying in the storage system specified by the copy-source storage system ID 1221 the copy-source storage volume for the remote copy. The copy-destination storage system ID 1223 is an identifier for specifying a storage system in which a copy-destination storage volume for the remote copy exists. The copy-destination storage volume ID 1224 is an identifier for specifying in the storage system specified by the copy-destination storage system ID 1223 the copy-destination storage volume for the remote copy.

Figure 11:
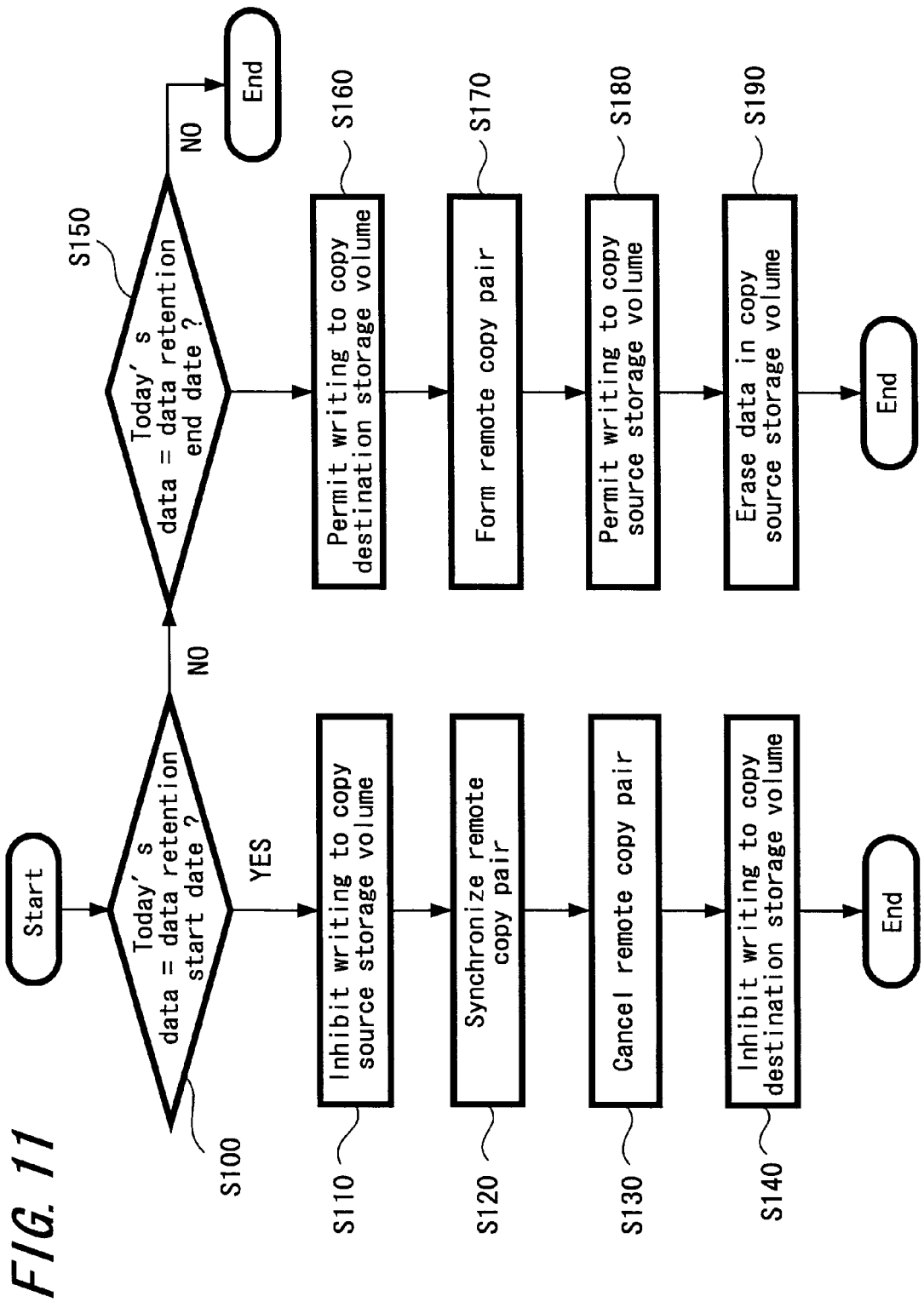
FIG. 11 is a flow chart of processing according to a control program of the management server.

FIG. 11 is a flow chart of processing executed by the control program 1230 stored in the memory 1200 of the management server 1000 in an embodiment of the present invention.

The CPU 1300 in the management server 1000 reads out the control program 1230 in the memory 1200, and executes the following processing.

The CPU 1300 reads out the data-retention period table 1210 in the memory 1200, and executes the following processing with respect to all the records.

The CPU 1300 compares the today's date with a value of the data-retention start date 1213 in a record of the data-retention period table 1210 (step S100), and proceeds to step S110 if coincides. For example, in case that the today's date is "2005/1/31" and the value of the data-retention start date 1213 is "2005/1/31", the CPU 1300 proceeds to step S110. On the other hand, if the today's date does not coincide with the value of the data-retention start date 1213 in the record of the data-retention period table 1210, the CPU 1300 proceeds to step S150. For example, in case that the today's date is "2010/1/31" and the value of the data-retention start date 1213 is "2005/1/31", the CPU 1300 proceeds to step S150.

When the today's date coincides with the data-retention start date in judgment of step S100, the CPU 1300 obtains values of the storage system ID 1211 and storage volume ID 1212 in the record of the data-retention period table 1210, and transmits from the HBA 1100 to the storage system specified by the obtained value of the storage system ID 1211 control information to inhibit writing to the storage volume specified by the obtained storage volume ID 1212 (step S110).

For example, in case that the value of the storage system ID 1211 is "10000" and the value of the storage volume 1212 is "00", the control information to inhibit writing to the storage volume specified by the storage volume ID "00" is transmitted to the primary storage system 4000 specified by the storage system ID "10000". When receiving the control information to inhibit writing to the storage volume specified by the storage volume ID "00" from the management server 1000, the channel controller 4200 in the primary storage system 4000 communicates with the control memory 4400, and rewrites the value of the write-permission state 4412 into "No" with respect to the record whose value of the storage volume ID 4411 of the access control table 4410 is "00".

Next, the CPU 1300 obtains the values of the storage system ID 1211 and storage volume ID 1212 in the record of the data-retention period table 1210, refers to the remote copy pair table 1220, and obtains a record in which the value of the copy-source storage system ID 1221 coincides with the value of the storage system ID 1211 and the value of the copy-source storage volume ID 1222 coincides with the value of the storage volume ID 1212. Further, the CPU 1300 transmits control information to synchronize a remote copy pair, in which the storage volume ID coincides with the value of the copy-source storage volume ID 1222; the remote side storage system ID coincides with the value of the copy-destination storage system ID 1223; and the remote side storage volume ID coincides with the value of the copy-destination storage volume ID 1224, from the HBA 1100 to the storage system specified by the value of the copy-source storage system ID 1221 in the obtained record of the remote copy pair table 1220 (step S120). In this case, the corresponding relation between the remote copy pair of the copy-source storage volume ID 1222 and the copy-destination storage volume ID 1224 is retained in advance in the remote copy pair table 1220.

For example, in case that the value of the storage system ID 1211 is "10000" and the value of the storage volume ID is "00", the CPU 1300 refers to the remote copy pair table 1220, and obtains the record in which the value of the copy-source storage system ID 1221 is "10000" and the value of the copy-source storage volume ID is "00". The CPU 1300 transmits control information to synchronize a remote copy pair, in which the storage volume ID is "00"; the value of the copy-destination storage system ID 1223 in the record obtained by the remote side storage system ID is "20000"; and the value of the copy-destination storage volume ID 1224 in the record obtained by the remote side storage volume ID is "A0", to the primary storage system 4000 specified by the storage system ID "10000".

When receiving the control information to synchronize the remote copy pair, in which the storage volume ID is "00"; the remote side storage system ID is "20000"; and the remote side storage volume ID is "A0", from the management server 1000, the channel controller 4200 in the primary storage system 4000 waits until the update data queue 4510 in the cache memory 4500 becomes empty. When the update data queue 4510 becomes empty, then the channel controller 4200 returns to the management server 1000 a reply indicating that the synchronization of the remote copy pair is successful. When receiving the reply indicating that the synchronization of the remote copy pair is successful from the primary storage system 4000 through the HBA 1100, the CPU 1300 in the management server 1000 proceeds to the next step.

Next, the CPU 1300 obtains the values of the storage system ID 1211 and storage volume ID 1212 in the record of the data-retention period table 1210, refers to the remote copy pair table 1220, and obtains a record in which the value of the copy-source storage system ID 1221 coincides with the value of the storage system ID 1211, and the value of the copy-source storage volume ID 1222 coincides with the value of the storage volume ID 1212. Then, the CPU 1300 transmits control information to cancel the remote copy pair, in which the storage volume ID coincides with the value of the copy-source storage volume ID 1222; the remote side storage system ID coincides with the value of the copy-destination storage system ID 1223; and the remote side storage volume ID coincides with the value of the copy-destination storage volume ID 1224, from the HBA 1100 to the storage system specified by the value of the copy-source storage system ID 1221 in the obtained record of the remote copy pair table 1220 (step S130).

For example, in case that the value of the storage system ID 1211 is "10000" and the value of the storage volume ID 1212 is "00", the CPU 1300 refers to the remote copy pair table 1220, and obtains the record in which the value of the copy-source storage system ID 1221 is "10000" and the value of the copy-source storage volume ID is "00". The CPU 1300 transmits the control information to cancel the remote copy pair, in which the storage volume ID is "00"; the value of the copy-destination storage system ID 1223 in the record obtained by the remote side storage system ID is "20000"; and the value of the copy-destination storage volume ID 1224 in the record obtained by the remote side storage volume ID is "A0", to the primary storage system 4000 specified by the storage system ID "10000".

When receiving from the management server 1000 the control information to cancel the remote copy pair, in which the storage volume ID is "00"; the remote side storage system ID is "20000"; and the remote side storage volume ID is "A0", the channel controller 4200 in the primary storage system 4000 communicates with the control memory 4400 and deletes from the remote copy pair table 4420 the record in which the value of the storage volume ID 4421 is "00"; the value of the remote side storage system ID 4423 is "20000"; and the value of the remote side storage volume ID 4424 is "A0".

Next, the CPU 1300 obtains the values of the storage system ID 1211 and storage volume ID 1212 in the record of the data-retention period table 1210, refers to the remote copy pair table 1220, and obtains a record in which the value of the copy-source storage system ID 1221 coincides with the value of the storage system ID 1211 and the value of the copy-source storage volume ID 1222 coincides with the value of the storage volume ID 1212. Further, the CPU 1300 transmits control information to inhibit writing to the storage volume whose storage volume ID is specified by the value of the copy-destination storage volume ID 1224 from the HBA 1100 to the storage system specified by the value of the copy-destination storage system ID 1223 in the obtained record of the remote copy pair table 1220 (step S140).

For example, in case that the value of the storage system ID 1211 is "10000" and the value of the storage volume ID 1212 is "00", the CPU 1300 refers to the remote copy pair table 1220, and obtains the record in which the value of the copy-source storage system ID 1221 is "10000" and the value of the copy-source storage volume ID is "00". The CPU 1300 transmits control information to inhibit writing to the storage volume specified by the value "A0" of the copy-destination storage volume ID 1224 in the record obtained by the storage volume ID to the secondary storage system 5000 specified by the value "20000" of the copy-destination storage system ID 1223 in the record obtained by the storage system ID.

When receiving from the management server 1000 the control information to inhibit writing to the storage volume specified by the storage volume ID "A0", the channel controller 5200 in the secondary storage system 5000 communicates with the control memory 5400, and rewrites the value of the write-permission state 5412 into "No" with respect to the record whose value of the storage volume ID 5411 of the access control table 5410 is "A0".

Then, the CPU 1300 ends the processing (step S100 through step S140) with respect to the record of the data-retention period table 1210 in the case where the today's date coincides with the data-retention start date.

In addition, when the today's date does not coincide with the data-retention start date in judgment of step S100, the CPU 1300 compares the today's date with a value of the data-retention end date 1214 in the record of the data-retention period table 1210 (step S150), and proceeds to step S160 when coincides. For example, in case that the today's date is "2010/1/31" and the value of the data-retention end date 1214 is "2010/1/31", the CPU 1300 proceeds to step S160. On the other hand, when the today's date does not coincide with the value of the data-retention end date 1214 in the record of the data-retention period table 1210, the processing with respect to the record of the data-retention period table 1210 is ended. For example, in case that the today's date is "2006/1/31" and the value of the data-retention end date 1214 is "2010/1/31", the processing with respect to the record of the data-retention period table 1210 is ended.

When the today's date coincides with the data-retention end date in judgment of step S150, the CPU 1300 obtains values of the storage system ID 1211 and storage volume ID 1212 in the record of the data-retention period table 1210, refers to the remote copy pair table 1220, and obtains the record in which the value of the copy-source storage system ID 1221 coincides with the value of the storage system ID 1211 and the value of the copy-source storage volume ID 1222 coincides with the value of the storage volume ID 1212. Then, the CPU 1300 transmits control information to permit writing to the storage volume whose storage volume ID is specified by the value of the copy-destination storage volume ID 1224 from the HBA 1100 to the storage system specified by the value of the copy-destination storage system ID 1223 in the obtained record of the remote copy pair table 1220 (step S160).

For example, in case that the value of the storage system ID 1211 is "10000" and the value of the storage volume ID 1212 is "00", the CPU 1300 refers to the remote copy pair table 1220, and obtains the record in which the value of the copy-source storage system ID 1221 is "10000" and the value of the copy-source storage volume ID is "00". The CPU 1300 transmits control information to permit writing to the storage volume specified by the value "A0" of the copy-destination storage volume ID 1224 in the record obtained by the storage volume ID, to the secondary storage system 5000 specified by the value "20000" of the copy-destination storage system ID 1223 in the record obtained by the storage system ID. When receiving from the management server 1000 the control information to permit writing to the storage volume specified by the storage volume ID "A0", the channel controller 5200 in the secondary storage system 5000 communicates with the control memory 5400, and rewrites the value of the write-permission state 5412 into "Yes" with respect to the record whose value of the storage volume ID 5411 in the access control table 5410 is "A0".

Next, the CPU 1300 obtains the values of the storage system ID 1211 and storage volume ID 1212 in the record of the data-retention period table 1210, refers to the remote copy pair table 1220, and obtains the record in which the value of the copy-source storage system ID 1221 coincides with the value of the storage system ID 1211 and the value of the copy-source storage volume ID 1222 coincides with the value of the storage volume ID 1212. Further, the CPU 1300 transmits control information to form a remote copy pair, in which the storage volume ID is the value of the copy-source storage volume ID 1222; the remote side storage system ID is the value of the copy-destination storage system ID 1223; and the remote side storage volume ID is the value of the copy-destination storage volume ID 1224, from the HBA 1100 to the storage system specified by the value of the copy-source storage system ID 1221 in the obtained record of the remote copy pair table 1220 (step S170).

For example, in case that the value of the storage system ID 1211 is "10000" and the value of the storage volume ID 1212 is "00", the CPU 1300 refers to the remote copy pair table 1220, and obtains the record in which the value of the copy-source storage system ID 1221 is "10000" and the value of the copy-source storage volume ID is "00". The CPU 1300 transmits the control information to form the remote copy pair, in which the storage volume ID is "00"; the value of the copy-destination storage system ID 1223 in the record obtained by the remote side storage system ID is "20000"; and the value of the copy-destination storage volume ID 1224 in the record obtained by the remote side storage volume ID is "A0", to the primary storage system 4000 specified by the storage system ID "10000". When receiving from the management server 1000 the control information to form the remote copy pair, in which the storage volume ID is "00"; the remote side storage system ID is "20000"; and the remote side storage volume ID is "A0", the channel controller 4200 in the primary storage system 4000 communicates with the control memory 4400, and adds to the remote copy pair table 4420 the record in which the value of the storage volume ID 4421 is "00"; the value of the volume attributes 4422 is "Primary"; the value of the remote side storage system ID 4423 is "20000"; and the value of the remote side storage volume ID 4424 is "A0".

Next, the CPU 1300 obtains the values of the storage system ID 1211 and storage volume ID 1212 in the record of the data-retention period table 1210, and transmits from the HBA 1100 control information to permit writing to the storage volume specified by the obtained storage volume ID 1212 to the storage system specified by the obtained value of the storage system ID 1211 (step S180).

For example, in case that the value of the storage system ID 1211 is "10000" and the value of the storage volume ID 1212 is "00", the control information to permit writing to the storage volume specified by the storage volume ID "00" is transmitted to the primary storage system 4000 specified by the storage system ID "10000". When receiving from the management server 1000 the control information to permit writing to the storage volume specified by the storage volume ID "00", the channel controller 4200 in the primary storage system 4000 communicates with the control memory 4400, and rewrites the value of the write-permission state 4412 into "Yes" with respect to the record whose value of the storage volume ID 4411 in the access control table 4410 is "00".

Next, the CPU 1300 obtains the values of the storage system ID 1211 and storage volume ID 1212 in the record of the data-retention period table 1210, and transmits a request for erasing data in the storage volume specified by the obtained storage volume ID 1212 to the storage system specified by the obtained value of the storage system ID 1211 (step S190).

For example, in case that the value of the storage system ID 1211 is "10000" and the value of the storage volume ID 1212 is "00", the request for erasing the data in the storage volume specified by the storage volume ID "00" is transmitted to the primary storage system 4000 specified by the storage system ID "10000". When receiving from the management server 1000 the request for erasing the data in the storage volume specified by the storage volume ID "00", the channel controller 4200 in the primary storage system 4000 communicates with the control memory 4400, refers to the contents of the remote copy pair table 4420, and obtains the record whose value of the storage volume ID 4421 is "00". The channel controller 4200 stores the data erasure request from the management server 1000 in the update data queue 4510 when the value of the volume attribute 4422 in the obtained record is "Primary", and further the channel controller 4200 erases through the cache memory 4500 and disk controller 4600 the data in the storage volume 4710 specified by the storage volume ID "00".

Then, the channel controller 4300 reads out the data erasure request in the update data queue 4510, obtains the storage volume ID "00" from the read-out data erasure request, and obtains the record whose storage volume ID 4411 is "00" from the remote copy pair table 4420. The channel controller

4300 obtains the value "20000" of the remote side storage system ID 4423 and value "A0" of the remote side storage volume ID 4424 from the obtained record, and transmits to the secondary storage system 5000 specified by storage system ID "20000" the data erasure request read out from the update data queue 4510 with respect to the storage volume specified by storage volume ID "A0".

When receiving the data erasure request from the primary storage system 4000, the channel controller 5300 confirms the value "Yes" of the write-permission state 5412 in the record whose value of the storage volume ID 5411 is "A0", erases data in the storage volume 5710 specified by the storage volume ID "A0" through the cache memory 5500 and disk controller 5600, and returns to the primary storage system 4000 a reply indicating success of the data erasure.

When receiving the reply indicating that the transmitted data erasure request is normally completed, the channel controller 4300 deletes the data erasure request stored in the update data queue 4510.

Then, the CPU 1300 ends the processing (step S150 through step S190) of the record in the data-retention period table 1210 in the case that the today's date coincides with the data-retention end date.

The data-retention period table 1210, remote copy pair table 1220, and control program 1230 of the management server 1000 shown in FIG. 8 may be configured in the application server 2000, primary storage system 4000 or secondary storage system 5000; and the application server 2000, primary storage system 4000 or secondary storage system 5000 may execute the processing of erasing the data in the copy-source storage volume and processing of erasing the data in the copy-destination storage volume in the steps from step S150 to step S190 among the remote copy control operations of the management server 1000 in the case that the today's date coincides with the data-retention end date.

In this case, both the processing of erasing the data in the copy-source storage volume and processing of erasing the data in the copy-destination storage volume may be performed simultaneously (in the same process cycle), or the processing of erasing the data in the copy-destination storage volume may be performed after the processing of erasing the data in the copy-source storage volume is performed.

Hence, when the management server 1000 performs the erasure of data, the data can be erased according to control timing of the management server 1000. Also, when the application server 2000 performs the erasure of data, the data can be erased according to access timing of the application server 2000. Further, when the primary storage system 4000 or secondary storage system 5000 performs the erasure of data, a reference table storing an erasure object volume and erasure date is provided in the primary storage system 4000 or secondary storage system 5000; the reference table is referred to at regular intervals; and data in the erasure object volume can be erased voluntarily on the erasure date in the primary storage system 4000 or secondary storage system 5000.

With applying the embodiment of the present invention to a computer system having such configuration and controlling a write-permission state of a storage volume in a storage system and a remote copy between storage systems, remote copy resources can be prevented from being wasted uselessly during a data-retention period.

Not limited to the above-described embodiment of the present invention, another processing may be executed by the control program 1230 stored in the memory 1200 of the management server 1000 with a system configuration similar to the above embodiment. Since the other configuration is similar to the previous embodiment, an explanation thereof is omitted.

Figure 12:
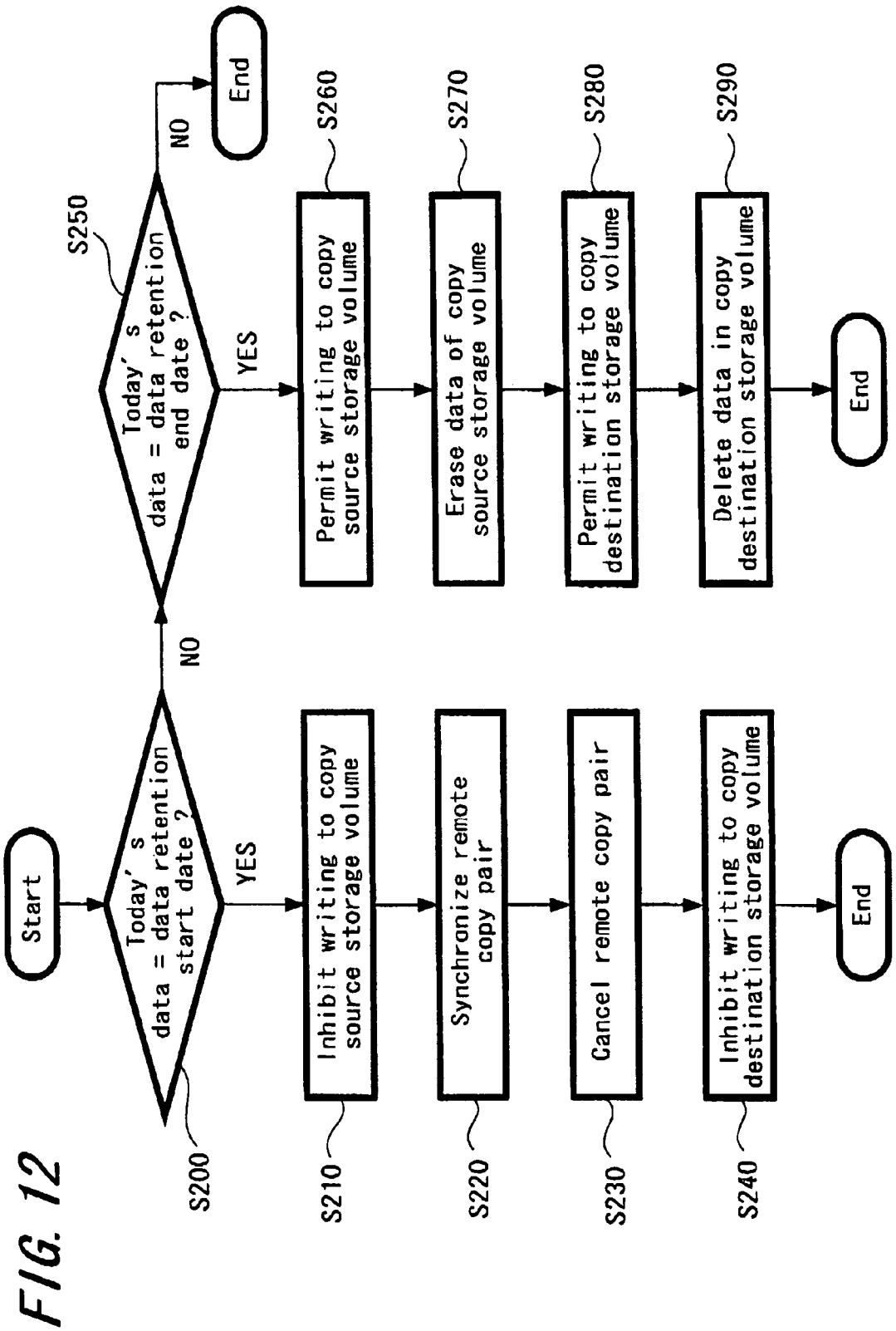
FIG. 12 is a flow chart of processing according to another control program of the management server.

FIG. 12 is a flow chart of another processing by the control program 1230 according to an embodiment of the present invention.

The CPU 1300 reads out and executes the control program 1230 in the memory 1200.

The CPU 1300 reads out the data-retention period table 1210 of the memory 1200, and executes the following processing with respect to all the records.

Since processing from step S200 to step S250 is similar to the processing from step S100 to step S150 in the above-described embodiment of the present invention shown in FIG. 11, an explanation thereof is omitted.

When the today's date coincides with the data-retention end date in judgment of step S250, the management server 1000 permits writing to the copy-source storage system (step S260). Since details of processing are similar to step S180 in the above-described embodiment of the present invention shown in FIG. 11, an explanation thereof is omitted.

Next, the management server 1000 erases data in the copy-source storage volume. The CPU 1300 obtains values of the storage system ID 1211 and storage volume ID 1212 in the record of the data-retention period table 1210, and transmits a request for erasing data in the storage volume specified by the obtained storage volume ID 1212 to the storage system specified by the obtained value of the storage system ID 1211 (step S270).

For example, in case that the value of the storage system ID 1211 is "10000" and the value of the storage volume ID 1212 is "00", a request for erasing data in the storage volume specified by the storage volume ID "00" is transmitted to the primary storage system 4000 specified by the storage system ID "10000". When receiving from the management server 1000 the request for erasing the data in the storage volume specified by the storage volume ID "00", the channel controller 4200 in the primary storage system 4000 erases the data in the storage volume 4710 specified by the storage volume ID "00" through the cache memory 4500 and disk controller 4600.

Next, the management server 1000 permits writing to the copy-destination storage volume (step S280). Since details of processing are similar to step S160 in the above-described embodiment of the present invention, an explanation thereof is omitted.

Next, the management server 1000 erases data in the copy-destination storage volume. The CPU 1300 obtains the values of the storage system ID 1211 and storage volume ID 1212 in the record of the data-retention period table 1210, refers to the remote copy pair table 1220, and obtains a record in which the value of the copy-source storage system ID 1221 coincides with the value of the storage system ID 1211 and the value of the copy-source storage volume ID 1222 coincides with the value of the storage volume ID 1212. Further, the CPU 1300 transmits a request for erasing data in the storage volume whose storage volume ID is specified by the value of the copy-destination storage volume ID 1224 to the storage system specified by the value of the copy-destination storage system ID 1223 of the obtained record in the remote copy pair table 1220 (step S290).

For example, in case that the value of the storage system ID 1211 is "10000" and the value of the storage volume ID 1212 is "00", the CPU 1300 refers to the remote copy pair table 1220, and obtains a record in which the value of the copy-source storage system ID 1221 is "10000" and the value of the copy-source storage volume ID is "00". The CPU 1300 transmits a request for erasing data in the storage volume specified by the value "A0" of the copy-destination storage volume ID 1224 in the record obtained by the storage volume ID to the secondary storage system 5000 specified by the value "20000" of the copy-destination storage system ID 1223 in the record obtained by the storage system ID. When receiving from the management server 1000 the request for erasing the data in the storage volume specified by the storage volume ID "A0", the channel controller 5200 in the secondary storage system 5000 erases the data in the storage volume 5710 specified by the storage volume ID "A0" through the cache memory 5500 and disk controller 5600.

Then, the CPU 1300 ends processing (step S250 through step S290) of the record in the data-retention period table 1210 in the case that the today's date coincides with the data-retention end date.

Accordingly, when the today's date coincides with the data-retention end date, data can be erased without forming a remote copy pair.

The data-retention period table 1210, remote copy pair table 1220, and control program 1230 of the management server 1000 shown in FIG. 8 may be configured in the application server 2000, primary storage system 4000, or secondary storage system 5000; and the application server 2000, primary storage system 4000, or secondary storage system 5000 executes the processing of erasing the data in the copy-source storage volume and processing of erasing the data in the copy-destination storage volume in the steps from step S250 to step S290 among the remote copy control operations of the management server 1000 in the case that the today's date coincides with the data-retention end date.

In this case, both the processing of erasing the data in the copy-source storage volume and processing of erasing the data in the copy-destination storage volume may be performed simultaneously (in the same process cycle), or the processing of erasing the data in the copy-destination volume may be performed after the processing of erasing the data in the copy-source storage volume is performed.

Hereupon, in the case that the secondary storage system 5000 executes the processing of erasing the data, whether un-erased data within the data-retention period exists in the primary storage system 4000 or not is confirmed. When un-erased data within the data-retention period exists in the primary storage system 4000, the secondary storage system 5000 can not execute the processing of erasing the data. When the data in the primary storage system 4000 has already been erased after the data-retention period elapsed, the secondary storage system 5000 can execute the processing of erasing the data.

Accordingly, when the management server 1000 performs the erasure of data, the data can be erased according to control timing of the management server 1000. Also, when the application server 2000 performs the erasure of data, the data can be erased according to access timing of the application server 2000. In addition, when the primary storage system 4000 or secondary storage system 5000 performs the erasure of data, a reference table for storing an erasure object volume and erasure date is provided in the primary storage system 4000 or secondary storage system 5000; the reference table is referred to at regular intervals; and data in the erasure object volume can be erased voluntarily on the erasure date in the primary storage system 4000 or secondary storage system 5000. When the secondary storage system 5000 performs the erasure of data, necessary data can be prevented from being erased, because data is erased after confirming whether the data in the primary storage system 4000 exists or not.

Having described preferred embodiments of the invention with reference to the accompanying drawings, it is to be understood that the invention is not limited to those specific embodiments and that various changes and modifications could be effected therein by one skilled in the art without departing from the spirit or scope of the invention as defined in the appended claims.

What is claimed is:

1. A data processing system comprising:
a business computer;
a plurality of first storage systems to store data used by said business computer in a plurality of first volumes;
a plurality of second storage systems to store through a communication line a copy of data stored in said first storage systems in a plurality of second volumes; and
a management computer to connect to each first storage system and each second storage system and to control said first storage system and/or said second storage system,
wherein a first storage system of said first storage systems:
controls whether access from said business computer to a first volume is to be inhibited and/or permitted based on control information, corresponding to said first volume, from said management computer, and
stores a corresponding relation between said first volume and a second volume and controls a start and stop of data transfer from said first volume to said second volume and/or a cancellation of said corresponding relation based on the control information from said management computer,
wherein a second storage system of said second storage systems:
controls whether access from said business computer to said second volume is to be inhibited and/or permitted based on control information, corresponding to said second volume, from said management computer, and
stores a corresponding relation between said second volume and said first volume and controls a start and stop of data transfer from said second volume to said first volume and/or cancellation of said corresponding relation based on the control information from said management computer,
wherein said management computer controls access inhibited or permitted state and controls such that said first storage system controls a start and stop of data transfer from said first volume to said second volume and/or a cancellation of said corresponding relation based on a data-retention period set in advance, thereby controlling said first storage system with respect to data transfer between said first volume and said second volume and data writing to said first volume, and controlling said second storage system with respect to data transfer between said second volume and said first volume and data writing to said second volume, and
wherein said management computer, when said data-retention period is started: transmits control information to inhibit writing to said first volume to said first storage system,
stores the corresponding relation between said first volume and said second volume in said management computer,
transmits control information to cause said first storage system to stop the data transfer from said first volume to said second volume and to cancel the corresponding relation set in advance between said first volume and said second volume to said first storage system, and
transmits control information to inhibit writing to said second volume to said second storage system,
wherein said management computer, when said data-retention period has lapsed:
transmits control information to permit writing to said second volume to said second storage system,
transmits control information to cause said first storage system to start data transfer from said first volume to said second volume based on said corresponding relation stores in said management computer to said first storage system, and
transmits control information to permit writing to said first volume to said first storage system.

2. A data processing system according to claim 1, wherein said management computer, when said data-retention period has lapsed:
controls said second storage system from the access inhibited state to the access permitted state,
controls said first storage system from the access inhibited state to the access permitted state, and
transmits a data update request to erase data in said first volume to said first storage system,
wherein said first storage system transfers update data to said second storage system through said communication line, and simultaneously with or after erasing data in said first volume, and
wherein said second storage system erases data in said second volume by the update data transferred from said first storage system.

3. A data processing system according to claim 1, wherein said management computer, when said data-retention period has lapsed:
controls said first storage system from the access inhibited state to the access permitted state,
controls said second storage system from the access inhibited state to the access permitted state, and
transmits a data update request to erase data in said first volume to said first storage system,
wherein said first storage system transmits to said second storage system a data update request to erase data in said second volume simultaneously with or after erasing data in said first volume, and
wherein said second storage system erases data in said second volume.

4. A storage system in which when accessing data stored in a plurality of first volumes in a first storage system from a business computer, a copy of data stored in said first volumes is stored in a plurality of second volumes in a second storage system based on control from a management computer, comprising:
an access control unit for controlling whether access from said business computer to a first volume is to be inhibited and/or permitted based on control information, corresponding to said first volume, from said management computer; and
a data transfer control unit for storing a corresponding relation between said first volume and a second volume and for controlling a start and stop of data transfer from said first volume to said second volume and/or a cancellation of said corresponding relation based on the control information from said management computer,
wherein the access inhibited or permitted state of said access control unit and the start and stop of data transfer from said first volume to said second volume and/or a cancellation of said corresponding relation of said data transfer control unit are controlled in accordance with the control information from said management computer based on a data-retention period set in advance, thereby performing on said data transfer control unit data transfer to/from the second storage system and data writing to said first volume, and
wherein said management computer, when said data-retention period is started: transmits control information to inhibit writing to said first volume to said first storage system,
stores the corresponding relation between said first volume and said second volume in said management computer,
transmits control information to cause said first storage system to stop the data transfer from said first volume to said second volume and to cancel the corresponding relation set in advance between said first volume and said second volume to said first storage system, and
transmits control information to inhibit writing to said second volume to said second storage system,
wherein said management computer,
when said data-retention period has lapsed:
transmits control information to permit writing to said second volume to said second storage system,
transmits control information to cause said first storage system to start data transfer from said first volume to said second volume based on said corresponding relation stores in said management computer to said first storage system, and transmits control information to permit writing to said first volume to said first storage system.

5. A storage system according to claim 4, wherein when said data-retention period is started, said access control unit inhibits writing to said first volume in accordance with control information, corresponding to said first volume, from said management computer to inhibit writing to said first volume,
wherein said data transfer control unit cancels the corresponding relation between said first volume and said second volume in accordance with control information to stop the data transfer from said first volume to said second volume and to cancel the corresponding relation set in advance between said first volume and said second volume, and then control information to inhibit writing to said second volume is transmitted from said management computer to said access control unit in said second storage system.

6. A storage system according to claim 4, wherein when said data-retention period has lapsed, control information to permit writing to said second volume is transmitted from said management computer to said access control unit in said second storage system,
wherein said data transfer control unit starts data transfer from said first volume to said second volume based on said corresponding relation in accordance with control information to start the data transfer from said first volume to said second volume, and
wherein said access control unit permits writing to said first volume in accordance with the control information from said management computer to permit writing to said first volume.

7. A storage system according to claim 4, wherein when said data-retention period has lapsed, the access inhibited state of the access control unit in said second storage system is controlled to be the access permitted state simultaneously with or after transferring to said second storage system update data for erasing data and erasing data in said first volume, data in said second volume is erased in said second storage system by the update data transferred from said first storage system.

8. A storage system according to claim 4, wherein when said data-retention period has lapsed, the access inhibited state of said access control unit in said second storage system is controlled to be the access permitted state, and simultaneously with or after erasing the data in said first volume, a data update request for erasing data in said second volume is transmitted to said second storage system and the data in said second volume is erased in said second storage system.

9. A data processing method in which when accessing data stored in a plurality of first volumes of a first storage system from a business computer, a copy of data stored in said first volumes is stored in a plurality of second volumes of a second storage system based on control from a management computer, said data processing method comprising the steps of:

generating control information in said management computer;

controlling the access from said business computer to a first volume to be inhibited and/or permitted in said first storage system based on the control information, corresponding to said first volume, from said management computer;

controlling the access from said business computer to a second volume to be inhibited and/or permitted in said second storage system based on the control information, corresponding to said second volume, from said management computer; and storing a corresponding relation between said first volume and said second volume and controlling a start and stop of data transfer from said first volume to said second volume and/or a cancellation of said corresponding relation between said first storage system and said second storage system based on the control information from said management computer, wherein said management computer controls the access inhibited or permitted state in said controlling step and controls the start and stop of data transfer from said first volume to said second volume and/or a cancellation of said corresponding relation between said first storage system and said second storage system in said storing step based on a data-retention period set in advance, thereby controlling in said data transfer control step the data transfer between said first storage system and said second storage system and data writing to said first volume in said first storage system, and wherein said management computer, when said data-retention period is started: transmits control information to inhibit writing to said first volume to said first storage system, stores the corresponding relation between said first volume and said second volume in said management computer, transmits control information to cause said first storage system to stop the data transfer from said first volume to said second volume and to cancel the corresponding relation set in advance between said first volume and said second volume to said first storage system, and transmits control information to inhibit writing to said second volume to said second storage system, wherein said management computer, when said data-retention period has lapsed:

transmits control information to permit writing to said second volume to said second storage system, transmits control information to cause said first storage system to start data transfer from said first volume to said second volume based on said corresponding relation stores in said management computer to said first storage system, and transmits control information to permit writing to said first volume to said first storage system.

10. A data processing method according to claim 9, wherein said management computer, when said data-retention period is started:

controls writing to said first volume in said first storage system to be inhibited in said access control step in accordance with control information to inhibit writing to said first volume, cancels the corresponding relation between said first volume and said second volume in said data transfer control step in said first storage system in accordance with control information to stop the data transfer from said first volume to said second volume and to cancel the corresponding relation set in advance between said first volume and said second volume, and controls writing to said second volume to be inhibited in said access control step in said second storage system in accordance with control information to inhibit writing to said second volume.

11. A data processing method according to claim 9, wherein said management computer, when said data-retention period has lapsed:

controls writing to said second volume to be permitted in said access control step in said second storage system in accordance with control information, corresponding to said second volume, to permit writing to said second volume, starts the data transfer from said first volume to said second volume in said data transfer control step in said first storage system and/or said second storage system based on said corresponding relation stored in said management computer in accordance with control information to start the data transfer from said first volume to said second volume, and controls writing to said first volume to be permitted in said access control step in said first storage system in accordance with control information to permit writing to said first volume.

12. A data processing method according to claim 11, wherein said management computer, when said data-retention period has lapsed:

controls the access inhibited state into the access permitted state in said access control step in said second storage system and controls the access inhibited state into the access permitted state in said access control step in said first storage system and transmits to said first storage system a data update request for erasing data in said first volume, wherein said first storage system transfers update data to said second storage system, and simultaneously with or after erasing data in said first volume, and wherein said second storage system erases data in said second volume with the update data transferred from said first storage system.

13. A data processing method according to claim 11, wherein said management computer, when said data-retention period has lapsed:

controls the access inhibited state into the access permitted state in said access control step in said first storage system and controls the access inhibited state into the access permitted state in said access control step in said second storage system and transmits to said first storage system a data update request for erasing data in said first volume, wherein said first storage system transmits to said second storage system a data update request for erasing data in said second volume simultaneously with or after erasing data in said first volume, and wherein said second storage system erases the data in said second volume.

14. A computer system comprising:

an application server, a primary storage system which stores data used by said application server in a plurality of first storage volumes, a secondary storage system which stores a copy of data stored in said primary storage system in a plurality of second storage volumes, and a management server which controls said primary storage system and/or said secondary storage system, wherein said primary storage system and said secondary storage system are configured to include:

a control memory and a cache memory, a channel controller which controls data input to/output from said application server and which is capable of data reading or data writing with respect to said control memory and said cache memory, an access control table provided in said control memory, in which an access inhibited and/or permitted state with respect to said first storage volume and said second storage volume is stored, a remote copy pair table provided in said control memory, in which a corresponding relation between a first storage volume and a second storage volume is stored, and a disk controller which interfaces said first storage volume and said second storage volume;

wherein said management server is configured to include:

a memory, a central processing unit for performing control, a host bus adaptor which interfaces said first storage volume and said second storage volume, a data-retention period table provided in said memory, in which a data-retention period of data stored in said first storage volume and said second storage volume is stored, a remote copy pair table in which the corresponding relation between said first storage volume and said second storage volume is stored, and a control program in which a program for remote copy processing is stored, wherein the control program in said management server, when a data-retention period stored in said management server is started:

controls whether writing to said first storage volume is to be inhibited, and synchronizes the remote copy pair from said first storage volume to said second storage volume in accordance with the corresponding relation stored in said management server, cancels the corresponding relation set in advance between said first storage volume and said second storage volume, then controls writing to said second storage volume to be inhibited, and when said data-retention period has lapsed, controls whether writing to said second storage volume is to be permitted, forms a remote copy pair from said first storage volume to said second storage volume based on said corresponding relation stored in said management server, controls writing to said first storage volume to be permitted, and simultaneously with or after erasing data in said first storage volume, erases data in said second storage volume, wherein said management computer controls access inhibited or permitted state and controls such that said first storage system controls a start and stop of data transfer from said first volume to said second volume and/or a cancellation of said corresponding relation based on a data-retention period set in advance, thereby controlling said first storage system with respect to data transfer between said first volume and said second volume and data writing to said first volume, and controlling said second storage system with respect to data transfer between said second volume and said first volume and data writing to said second volume, wherein said management computer, when said data-retention period is started: transmits control information to inhibit writing to said first volume to said first storage system, stores the corresponding relation between said first volume and said second volume in said management computer, transmits control information to cause said first storage system to stop the data transfer from said first volume to said second volume and to cancel the corresponding relation set in advance between said first volume and said second volume to said first storage system, and transmits control information to inhibit writing to said second volume to said second storage system, wherein said management computer, when said data-retention period has lapsed:

transmits control information to permit writing to said second volume to said second storage system, transmits control information to cause said first storage system to start data transfer from said first volume to said second volume based on said corresponding relation stores in said management computer to said first storage system, and transmits control information to permit writing to said first volume to said first storage system.

15. A computer system according to claim 14, wherein said management server, when said data-retention period has lapsed:

controls said first storage volume from the access inhibited state to the access permitted state and controls said second storage volume from the access inhibited state to the access permitted state, thereby erasing data in said second storage volume simultaneously with or after erasing the data in said first storage volume.

* * * * *